(12) United States Patent
Borst et al.

(10) Patent No.: US 8,380,725 B2
(45) Date of Patent: Feb. 19, 2013

(54) MESSAGE FILTER WITH REPLACEMENT TEXT

(75) Inventors: Karl Joseph Borst, Toronto (CA); Sally Christensen, Richmond Hill (CA)

(73) Assignee: Ganz, Woodbridge, Ontario ( * ) Notice: Subject to any disclaimer, the term of this patent is extended or adjusted under 35 U.S.C. 154(b) by 130 days.

(21) Appl. No.: 12/849,371

(22) Filed: Aug. 3, 2010

(65) Prior Publication Data

US 2012/0036147 A1  Feb. 9, 2012

(51) Int. Cl.
*G06F 17/30* (2006.01)
(52) U.S. Cl. .................. 707/754; 715/255; 715/260
(58) Field of Classification Search .................. 707/754; 715/255, 260
See application file for complete search history.

(56) References Cited

U.S. PATENT DOCUMENTS

| | | | |
|---|---|---|---|
| 5,736,982 A | 4/1998 | Suzuki et al. | |
| 5,880,731 A | 3/1999 | Liles et al. | |
| 5,987,606 A | 11/1999 | Cirasole | |
| 6,519,771 B1 | 2/2003 | Zenith | |
| 6,704,784 B2 | 3/2004 | Matsuda | |
| 6,773,325 B1 | 8/2004 | Mawle et al. | |
| 6,773,344 B1 | 8/2004 | Gabai et al. | |
| 6,910,186 B2 | 6/2005 | Kim | |
| 7,171,154 B2 | 1/2007 | Fujisawa | |
| 7,549,119 B2 | 6/2009 | McCaffrey et al. | |
| 8,036,937 B2 * | 10/2011 | Tang et al. ................. | 705/14.46 |
| 8,118,673 B2 | 2/2012 | Coleman et al. | |
| 2002/0068500 A1 | 6/2002 | Gabai et al. | |
| 2002/0198940 A1 | 12/2002 | Bower et al. | |
| 2004/0003398 A1 | 1/2004 | Donian et al. | |
| 2004/0043806 A1 | 3/2004 | Kirby et al. | |
| 2004/0093266 A1 | 5/2004 | Dohring | |
| 2004/0111479 A1 | 6/2004 | Borden et al. | |
| 2004/0154022 A1 | 8/2004 | Boss et al. | |
| 2004/0242326 A1 | 12/2004 | Fujisawa et al. | |
| 2004/0249626 A1 * | 12/2004 | Neal ................................. | 704/1 |

(Continued)

FOREIGN PATENT DOCUMENTS

GB  2365364  2/2002
JP  2002063092  2/2002

(Continued)

OTHER PUBLICATIONS

Search Report dated Jun. 5, 2009 for PCT/CA2009/000271, filed Mar. 4, 2009.

(Continued)

*Primary Examiner* — Khanh Pham
(74) *Attorney, Agent, or Firm* — Pearne & Gordon LLP

(57) ABSTRACT

A computer network-based messaging system controls the content of messages sent by users. A database includes permitted words and replacement text elements corresponding to at least one permitted word. A message filter receives an entered word or phrase input by a user on a messaging device as part of a message. The message filter replaces the entered word in the message with a corresponding replacement text element stored in the database. A message sending part transmits the message including the replacement text element over a data network for viewing by other users only if every entered word in the message is included in the database. The message sending part transmits the message even though one or words contained in the replacement text element are not permitted words in the database. The system may allow deletion of a replacement text element from a message only in its entirety.

7 Claims, 3 Drawing Sheets

U.S. PATENT DOCUMENTS

| | | | |
|---|---|---|---|
| 2005/0059483 A1 | 3/2005 | Borge | |
| 2005/0177428 A1 | 8/2005 | Ganz | |
| 2005/0250415 A1 | 11/2005 | Barthold | |
| 2005/0250416 A1 | 11/2005 | Barthold | |
| 2006/0123127 A1 | 6/2006 | Littlefield | |
| 2006/0123338 A1* | 6/2006 | McCaffrey et al. | 715/531 |
| 2006/0253784 A1 | 11/2006 | Bower et al. | |
| 2006/0277167 A1 | 12/2006 | Gross et al. | |
| 2006/0293103 A1 | 12/2006 | Mendelsohn et al. | |
| 2007/0174408 A1 | 7/2007 | Paul et al. | |
| 2007/0250587 A1* | 10/2007 | Roberts | 709/206 |
| 2008/0163055 A1 | 7/2008 | Ganz et al. | |
| 2008/0168095 A1* | 7/2008 | Larcombe et al. | 707/104.1 |
| 2008/0221998 A1 | 9/2008 | Mendelsohn et al. | |
| 2009/0228557 A1 | 9/2009 | Ganz et al. | |
| 2010/0060662 A1 | 3/2010 | Law | |
| 2010/0287182 A1 | 11/2010 | Brooks et al. | |
| 2011/0113112 A1 | 5/2011 | Ganz et al. | |

FOREIGN PATENT DOCUMENTS

| | | |
|---|---|---|
| WO | 01/69829 A2 | 9/2001 |
| WO | 2006128224 A1 | 12/2006 |

OTHER PUBLICATIONS

Grace, "Web Site Tycoon's Next Goal: Sixth Grade", Woonsocket Call, Jun. 19, 2002.

http://web.archive.org.web.20031202190119/www.monopets.com/, Dec. 2, 2003.

Klotz, Hattie, "Look Out Pokemon; Neopets are Taking Over", The Ottawa Citizen, p. A. 1. FRO, Apr. 10, 2008.

Matusda, Kouichi, et al. "Culture Formation and its Issues in Personal Agent-oriented Virtual Society—"PAW 2"."Collaborative Virtual Environments (2002): 17-24.

"Barbie Girls Tips for Parents", Mattel, Inc., http://www.barbiegirls.com/legal/parents_text.html, downloaded on May 23, 2007.

"Barbie Revolutionizes The Way Girls Play", Mattel, Inc., http://investor.shareholder.com/common/download/download.cfm?companyid=MAT&fileid=224357&filekey=581edc95-c0d3-45f5-a6dc-cb3c2ab50331&filename=239128.pdf, downloaded on Mar. 29, 2011.

* cited by examiner

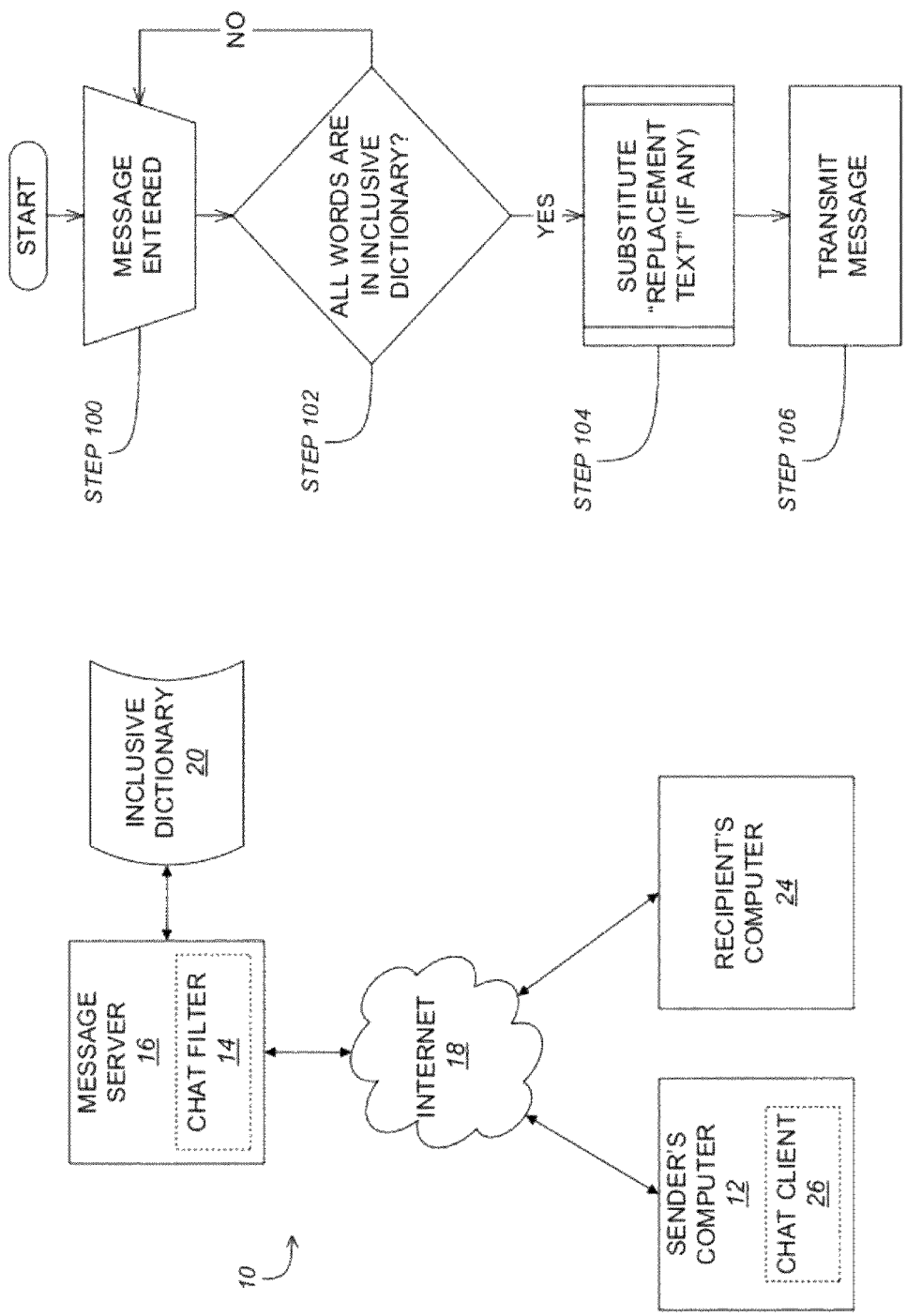

MESSAGE FILTER WITH REPLACEMENT TEXT

BACKGROUND

The present invention relates generally to computer network-based messaging systems, including so-called chat rooms, and more specifically to a method of filtering undesirable words and phrases in a chat room and to a messaging system including a message filter incorporating such method.

With the evolution of increasingly sophisticated Internet tools and the widespread availability of broadband Internet connections, the World Wide Web ("Web") experience is moving steadily beyond the passive dissemination of information, towards real-time interaction between simultaneous users. Virtual communities exist for groups that share every conceivable interest, hobby, or profession. Increasingly more people of all ages use the Internet as a place to meet and to interact with other people for work and for play. As a consequence, chat rooms have become ubiquitous on the Internet, and accordingly, the maintenance of behavioral standards and safety, especially for young people and minors, is becoming a major societal concern.

Consequently, administrators of chat sites face challenges related to maintaining standards of conduct to prevent a site from degenerating into a forum for types of discussion that were never intended. One such challenge is how to maintain standards within an environment like the Internet where the participants are anonymous and therefore cannot be held accountable with traditional methods. Around-the-clock real-time monitoring by the administrator is not economically feasible for most Internet businesses.

One common approach is to use basic word filters to eliminate offensive words and profanity from the chat conversation. Such filters, often referred to as "black lists" or "exclusive" filters, generally involve blocking words and/or phrases contained in a black list or exclusive dictionary. Unfortunately such simplistic exclusive dictionary approaches can never be exhaustive and are easily outwitted by the well-known practice of "obfuscation." This practice, also known by other labels such as "creative misspelling," involves users purposely misspelling words or phrases in a chat message in order to prevent the detection of the words or phrases by exclusive word filters, while still permitting the meaning of the words to be understood by human readers.

Another limitation of these exclusive filters is that, depending on the needs of a chat site, certain words and phrases that are neither profanity nor generally offensive may need to be discouraged in order to preserve certain specific site standards. For example, in a community site for children who do not fully grasp the importance of password safety, phrases like "what's your password," "gimme your pass," and "my password is" need to be discouraged. Furthermore, these needs arise dynamically out of the needs of a community and continually evolve. Accordingly, the ongoing task of maintaining an exclusive dictionary of all prohibited words and phrases requires devoting a tremendous amount of resources to constantly monitoring chat room conversations and updating the exclusive dictionary as new offensive language evolves. This is not practical or economically feasible for most Internet businesses. Furthermore, there will always be some delay in updating the exclusive dictionary based on monitoring, since it is nearly impossible for the administrator to anticipate all of the creative misspellings and word combinations that will need to be blocked.

Another approach is to use a more restrictive form of message filtering or chat filtering, known is "white list" or "inclusive" filtering. Such filters prevent the use of offensive words, as well as the use of word obfuscation, since they only allow words contained in a list of permitted words that have been preapproved for use in chatting. This list of permitted words in often referred to as a "white list" or "inclusive dictionary." However, in order to effectively block the use of offensive language, the inclusive dictionary must be kept relatively small, which can significantly hinder the ability of users to effectively chat with each other. Further, users often adopt "workarounds" by using permitted words in a context that implies offensive or otherwise inappropriate messages.

As described in U.S. Patent Application Publication No. 2009/0228557 to Ganz et al., a hybrid or multiple-layer chat filter was developed which uses a combination of an exclusive dictionary and an inclusive dictionary. While the system described therein overcomes many of the disadvantages of using either method alone, as with other inclusive dictionary-based filters, users are still limited to the words provided in the inclusive diction when formulating a message.

BRIEF SUMMARY

According to an aspect of the present invention, there is provided a computer network-based messaging system for controlling content of messages sent by users in the messaging system. The messaging system comprises: an electronic data storage device containing a database including a plurality of permitted words and at least one replacement text element corresponding to at least one of said plurality of permitted words; a message filter that receives an entered word or phrase input by a user on a messaging device as part of a message, wherein the message filter uses a processor to replace the entered word in the message with a replacement text element stored in the database that matches the entered word; and a message sending part that transmits the message including the replacement text element over a data network for viewing by at least one other user only if every word in the message is: a permitted word included in the database, and/or a word that forms part or all of a replacement text element included in the database. The message sending part transmits the message including the replacement text element even though one or more words contained in the replacement text element are not permitted words included in the database.

According to an aspect of the present invention, there is provided a method of filtering and modifying text messages comprising steps of: receiving a word or phrase as part of a message entered by a user on a data entry device; using a processor for comparing the received word to a plurality of permitted words contained in a database stored in a data storage device; using the processor for determining whether the received word matches one of the plurality of permitted words that has a corresponding replacement text element stored in the database, and retrieving the corresponding replacement text element; based on said determining, automatically using the processor for replacing the received word in the message with the retrieved replacement contained text element; and using the processor for deleting the replacement text element in response to receiving an editing command entered by the user on the data entry device, and preventing any portion of the text element from being deleted from the message unless the entire replacement text element is deleted.

BRIEF SUMMARY OF THE DRAWINGS

FIG. 1 is a simplified schematic view of a computer network-based messaging system including a chat filter according to an example embodiment of the invention;

FIG. 2 is a simplified flowchart illustrating a process of filtering and sending a chat message according to an example embodiment of the invention;

DETAILED DESCRIPTION

Figure 3:
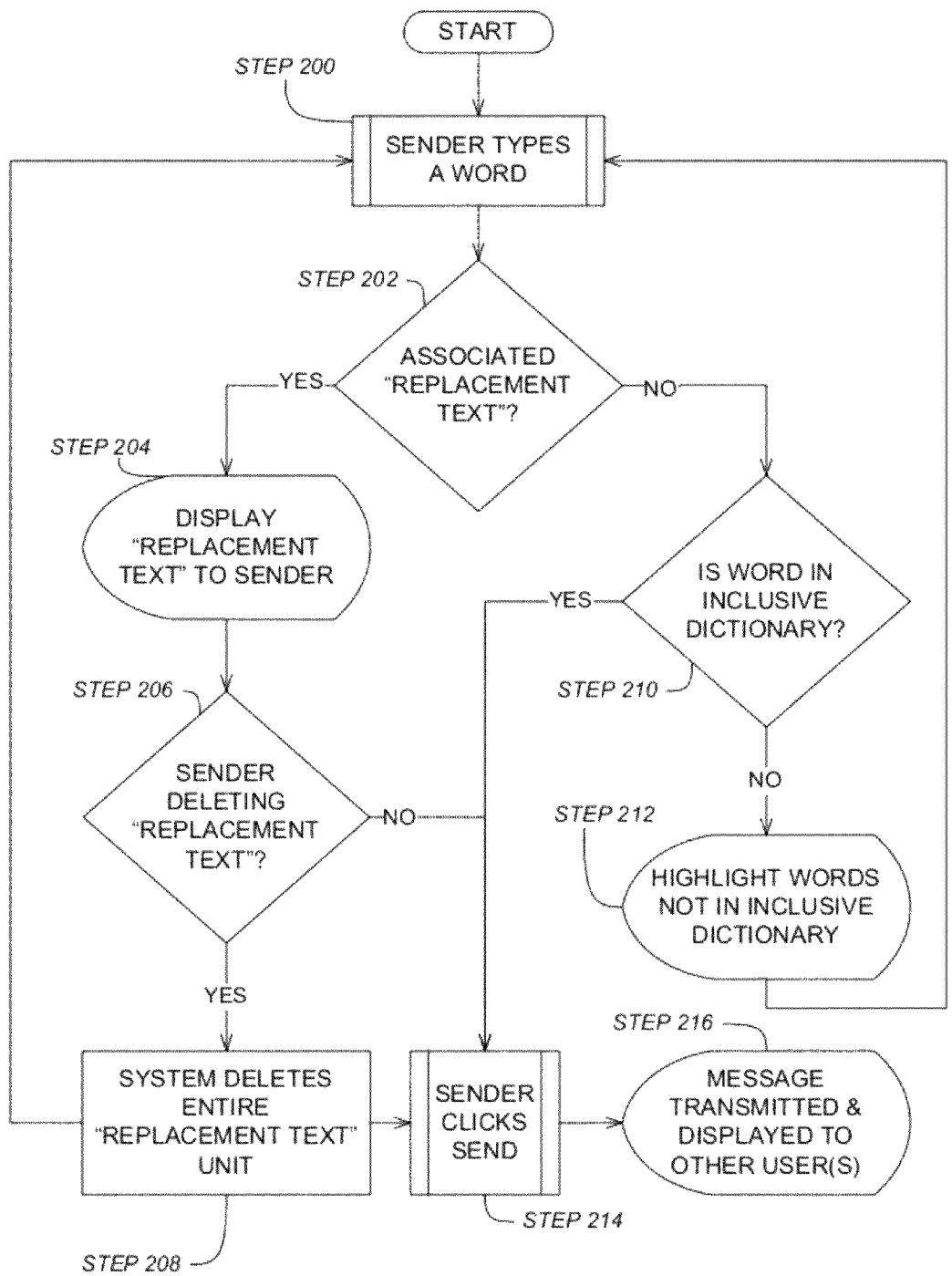
FIG. 3 is a simplified flowchart illustrating a process of filtering and sending a chat message according to another example embodiment of the invention.

As described above, a limitation of any chat filter that employs an inclusive dictionary (also referred to as a "white list") is that users are limited to using words included in the inclusive dictionary, which can considerably impede effective communication between users. As described above, users often develop workarounds that circumvent such a filter by combining several permitted words to create offensive or otherwise inappropriate messages. As described in U.S. Patent Application Publication No. 2009/0228557 to Ganz et al. (hereinafter "Ganz '557"), which is hereby incorporated by reference in its entirety, an inclusive dictionary can optionally be used together with an exclusive dictionary (also referred to as a "black list") to provide a multiple layer or hybrid chat filter. In such a hybrid system, the size of the inclusive dictionary can be expanded to include more words and provide additional flexibility, since offensive phrases composed of several permitted words can be blocked by the exclusive dictionary. Nonetheless, creative users will continue to develop workaround phrases to create offensive messages. The administrator of a chat filter may face the difficult choice of removing certain desirable words from the inclusive dictionary in order to circumvent such workarounds, or to face the challenge of keeping up with users' workaround attempts by continually supplementing the exclusive dictionary as new workarounds are discovered.

According to the present invention, an additional mechanism has been developed to allow the filter administrator to provide more flexibility to users by adding additional words to the inclusive dictionary, which are desirable for use in chatting but are often used as part of workaround phrases to communicate offensive messages. In particular, according to an aspect of the present invention, any word in the inclusive dictionary can be associated with replacement text. The associated replacement text may be another word or a phrase that is, for example, a synonym of the associated word listed in the inclusive dictionary. Thus, when a user types a word that is included in the inclusive dictionary and has replacement text, the word is automatically substituted with the replacement text. In the case where the replacement text is a synonym, if the user was using the word for its intended meaning, then the replacement text should approximate the user's original intent and the user can proceed to send the message without significant inconvenience. On the other hand, if the user was using the word as part of a workaround, such as a substitute for a phonetic equivalent that is not included in the inclusive dictionary, then the user's workaround attempt will have been foiled by the substitution of the replacement text. As an alternative, the system may also be designed so that the substitution occurs after the user instructs the system to send the message without notifying the user that the substitution has been made. As a result, only the recipient of the message will see the replacement text, making it more difficult for users to develop new workarounds.

In an example chat system having an inclusive dictionary filter, a chat room intended for young children might attempt to prevent users from revealing their gender by not including gender specific words such as "girl" in the inclusive dictionary. As a workaround, a creative user might substitute the word "abroad" for "a girl", allowing her to send the message "I am abroad", signifying her gender by implying the slang term "broad" as an indication of her female gender. However, by eliminating term "abroad" from the inclusive dictionary, the chat administrator will also inadvertently be preventing a well-intentioned user from using the term "abroad", for example, to communicate that they are traveling outside of his or her home country. Thus, according to an aspect of the present invention, by including the word "abroad" in the inclusive dictionary and associating it with the replacement text "overseas", when a user types "I am abroad" the message will automatically be changed to read "I am overseas." This effectively prevents a user from using the term "abroad" as part of a workaround with significantly inconveniencing a user who is trying to use the term "abroad" for its normal meaning.

Throughout this application, inclusive dictionaries containing only individual words are described. It should be appreciated that, if desired, such inclusive dictionary can also contain multiple-word phrases, each having corresponding replacement text.

Referring to FIG. 1, a simplified schematic view illustrating an example embodiment of a computer network-based messaging system 10 including a chat filter (also referred to as a "messaging filter" or "message filter") having a text replacement feature according to an aspect of the present invention. In the example embodiment, a chat filter is provided to prevent messages containing language considered to be offensive or inappropriate, as determined by an administrator of the system, from being sent by users. The example embodiment of a chat filter that is specifically described below includes an inclusive dictionary having a least one word that has associated replacement text. It is contemplated that the replacement text techniques described herein can be used with any message filter that includes an inclusive dictionary, for example the hybrid chat filter described in Ganz '557.

As illustrated in FIG. 1, the messaging system 10 according to the illustrated example embodiment includes a user computer, such as a sender's computer 12 connected to a message sending part, such as a messaging server 16, through a computer network, such as the Internet 18. Another user computer, for example a recipient computer 24 as shown in FIG. 1, is also connected to the messaging server 16 through the Internet 18. Other suitable public and/or private networks can be utilized individually or in combination as a substitute for the Internet 18 connections illustrated in FIG. 1. As will be appreciated by one of ordinary skill in the art, the messaging server 16 and the user computers 12, 24 may utilize custom computer hardware and software and/or any suitable commercially available computer hardware and software applications to implement the features of the aspect of the present invention described herein. It will also be appreciated that the specific functionality described below, as well as the differences in functionality between to the described sender's computer 12 and the described recipient's computer 24 are merely representative. The sender's computer 12 and the recipient's computer 24 can both be provided with similar functionality, and additional functionally can be provided as appropriate. Further, any appropriate number of user computers can be connected to the messaging system to allow any number of users to send and receive messages using the messaging system 10. Other possible modifications and additions to the messaging system 10 according to the present invention will be apparent to one of ordinary skill in the art.

Referring still to FIG. 1, the messaging server 16 includes a chat filter subsystem 14 and the sender's computer 12 includes a chat client 26. The chat filter subsystem 14 performs message filtering using a database that contains an inclusive dictionary 20 comprising, which is a database containing a list of words ("permitted words") that a user is permitted to include in a message. Further, according to an aspect of the present invention, each word contained in the inclusive dictionary 20 may also include a corresponding replacement text.

As one of ordinary skill in the art will appreciate, a suitable inclusive dictionary can be composed and updated as needed by an administrator of the messaging system 10. An editing tool may be provided to the system for this purpose. For purposes of illustration, a simplified examples of the inclusive dictionary 20 described above, is shown below in Table 1.

TABLE 1

| Example Inclusive Dictionary with Replacement Text | |
|---|---|
| Permitted Word | Replacement Text |
| a | |
| aargh | |
| aback | by surprise |
| abandons | |
| abide | |
| ability | skill |
| able | |
| aboard | |
| abound | |
| about | |
| above | |
| abroad | overseas |
| ... | ... |
| Potter | Harry Potter |
| ... | ... |

As is apparent from the example of Table 1, which shows an excerpted portion of an inclusive dictionary (also referred to as a "word database"), the replacement text entry for each permitted word is optional, so some permitted words do not have corresponding replacement text. As desired, such as to speed up processing, words in the inclusive dictionary may be flagged or otherwise identified as having corresponding replacement text.

It should be appreciated that the schematic diagram of FIG. 1 is not necessarily indicative of the physical location of the inclusive dictionary 20. One of ordinary skill in the art will appreciate that the inclusive dictionary 20 can be stored in any suitable data storage device or devices either contained within the messaging server 16 or that are otherwise connected locally or remotely for communication with the chat filter subsystem 14. As one of ordinary skill in the art will appreciate, the data storage devices may include hard disks, solid state memory devices, or the like and may be implemented as a single storage device or in a redundant arrangement, such as in a RAID (i.e. redundant array of independent disks) configuration. It should also be appreciated that, in an alternative embodiment, the chat filter subsystem 14 could be located on a computer other than the messaging server 16, such as on the sender's computer 12 as part of the chat client 26.

According to one embodiment of the present invention, as illustrated in the simplified flow diagram of FIG. 2, the process of filtering and sending a chat message begins at step 100 when a user (referred to as the "sender" in this example) composes and enters a message into a computer, such as the sender's computer 12 illustrated in FIG. 1. The message composed by the sender at step 100 includes one or more words entered into the sender's computer 12 by the sender. At step 102 the chat filter 14 examines the message to ensure that each of its words is contained in the inclusive dictionary 20. If not, then the sender must modify the message at step 100. Next, at step 104, if any entered word contained in the message has corresponding replacement text in the inclusive dictionary 20, then the chat filter 14 substitutes the replacement text for the entered word and displays the result to the user. Once the user is satisfied with the displayed message, it is transmitted (at step 106) via the Internet 18 to one or more other computers, such as the recipient computer 24, for viewing by one or more recipients. The message will not be transmitted until it is confirmed at step 102 that all of the words entered by the sender are permitted words contained in the inclusive dictionary 20. It should be appreciated that, according to the above-described embodiment of the invention, the message will be transmitted even though one or more words contained in the replacement text are not listed as permitted words in the inclusive dictionary 20.

It should also be appreciated that the illustrated order of processing of steps 100, 102 and 104 are merely representative, and that it is contemplated that steps 100, 102 and 104 could be performed in another suitable order or be performed concomitantly.

It is also contemplated to be within the scope of the present invention that any suitable combination of inclusive and exclusive dictionaries (such as in the hybrid system described in Ganz '557) may be used in combination with the present invention, such that at least one inclusive dictionary would be provided with replacement text as described herein. It is also contemplated that the some or all of the functions of the chat filter 14, as described herein, could be performed by the chat client 26 or other component on the sender's computer 12. Further, it is contemplated that the message server 16 could be eliminated entirely from messaging system 10 such that, for example, the sender's computer 12 and a recipient's computer 24 function in a so-called peer-to-peer mode.

As used herein, the term "type" or "typing" refers generally to methods for manually entering text into data entry devices by selecting individual letters or symbols or other characters. Typing can refer, for example, to entry of text by a user using a traditional keyboard, a keypad, a touch screen, a mouse, or the like, to select letters. Further, as used herein, the term "word" refers to a set of one or more letters, symbols or other characters employed by a user to represent an element of language that can be understood by another user. Words can be, for example, traditional spellings contained in a generally accepted dictionary, such as the Oxford English Dictionary, and/or informal, inventive, nontraditional spellings of words or phrases devised to communicate more efficiently or creatively with other users, including symbols and numeric characters.

The simplified flowchart of FIG. 3 illustrates a further embodiment of the present invention. The process starts with a user (sender) typing or otherwise entering a message into a message entry interface (e.g. a text box) on a computer (e.g. sender's computer 12) or another suitable messaging device or data entry device. At step 200, the sender types in a word and then, at step 202, the chat filter 14 determines if the typed word matches a word in the inclusive dictionary 20 that has corresponding replacement text. If so, the replacement text is substituted for the typed word and then, at step 204 the replacement text is displayed to the sender, which includes the typed text modified to include the replacement text. It is noted that, each replacement text that is substituted for a word in the typed text is treated as a single unit or element, regardless of the number of characters or words contained in the replacement text. At this point, the sender may choose to edit the processed text by adding or deleting text. If it is determined at step 206 that the sender is attempting to delete any portion of the replacement text, the entire replacement text unit is deleted at step 208, leaving no part (words or characters) of the replacement text. As an alternative to displaying the replacement text to the sender, as described in steps 204 to 208, the replacement text may not be displayed on the sender's computer 12, but only on the receipt's computer 24 after the message has been transmitted. This may help prevent users from learning which words had replacement text, making it more difficult to develop workarounds.

If, at step 202, the typed word does not have associate replacement text in the inclusive dictionary 20, the process proceeds to step 210. At step 210, the chat filter 14 determines if the typed word matches a permitted word listed in the inclusive dictionary (which has no replacement text). If not, then at step 212 the typed word is displayed to the user as highlighted text to indicate that it has been rejected. For example, a rejected typed word can be displayed in a color (e.g. orange) different from the color (e.g. white) of other text in the message being typed. Other suitable methods of highlighting the word may be used as well. The sender may be permitted to continue typing more words (i.e. at step 200), but the message will not be transmitted so long as it contains any rejected (i.e. highlighted) words.

Once the sender is satisfied with the message and it contains only permitted words (step 210) and/or replacement text contained in the inclusive dictionary (step 206) he or she may instruct the message entry interface to transmit the message at step 214. Then, at step 216 the message is transmitted via the Internet 18 to another computer or messaging device, such as the recipient's computer 24, and displayed to another user or users.

It should be appreciated that the computers 12, 24 and messaging devices described herein can be replaced by any suitable device having a microprocessor and data storage that is capable of inputting, transmitting, receiving and displaying a message to a user, for example a desktop, laptop or tablet computer, a cellular phone, a PDA, or the like. The messaging server, as referred to herein, can be any suitable computer system known in the art, such as the one described in U.S. Patent Application Publication No. 2009/0204908 A1 to Ganz, which is incorporated by reference herein. Further, the terms "computer network", "data network", "Internet" and the like, as used herein includes any suitable network, combination of networks, or other infrastructure for transmitting data between microprocessor-based devices, including wired, fiber optic, wireless networks and the like.

Figure 4:
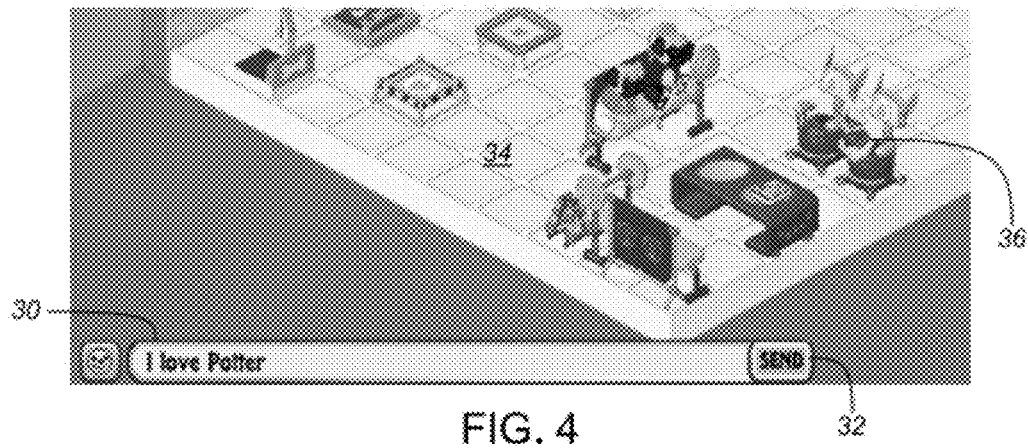
FIGS. 4-6 depict a series of computer screenshots showing the operation of a chat filter according to an example embodiment of the invention.
Figure 5:
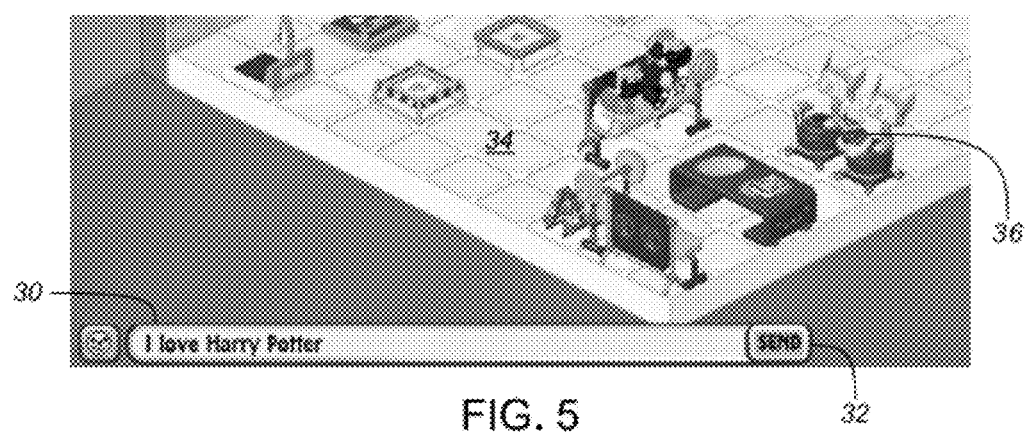
Figure 6:
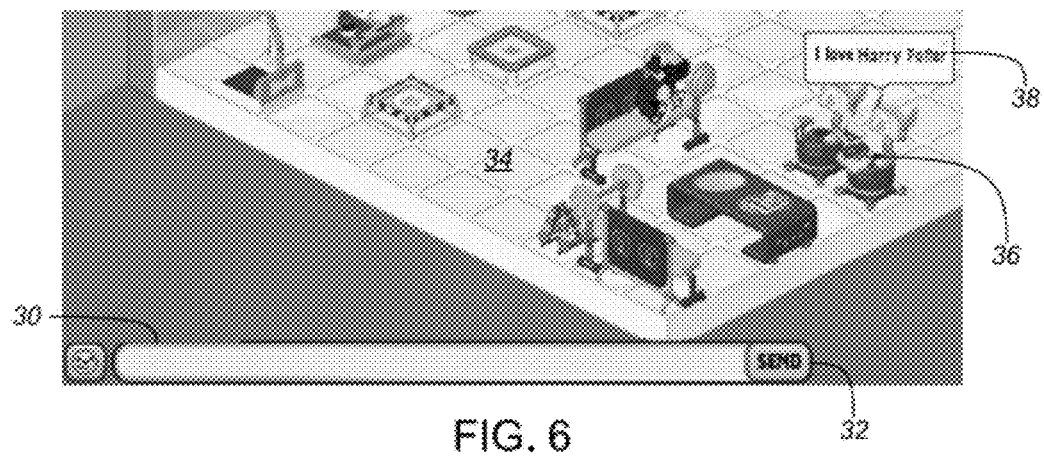

With reference to the example screenshots of FIGS. 4-6, an example of the operation of the embodiment of FIG. 3 will be described. In this example, a user wants to send a message to tell others that he or she is a fan of Harry Potter. However, the word "Harry" has been excluded from the inclusive dictionary by the administrator in order to prevent inappropriate phrases and workarounds from being used, for example "I have a harry but". To enable the well-intentioned user to send his message about Harry Potter, the word "Potter" is included in the inclusive dictionary along with the substitute text "Harry Potter". As shown in FIG. 4, using a messaging device, such as the sender's computer 12, the user types "I love Potter" into a text box 30. Then, in FIG. 5, when the user hits the spacebar or enters a punctuation symbol such as a period, comma, or the like, the message will automatically be changed to read "I love Harry Potter". Alternatively, the system may substitute the replacement text based on some other method of predicting that the user is finished entering a word, such as by waiting a predetermined period of time after the user stops typing. Once the user is satisfied with the message, the user clicks on the SEND button 32 and the message is displayed in the chat room 34 above the user's character or avatar 36 in a chat bubble 38. Alternatively, if the user attempts to click the send button before the system has processed the last word typed (for example if no final space or punctuation was entered), then the system may make the substitution at that time and, optionally, require the user to click the SEND button 32 again in order to transmit the message. Once transmitted, the message can then be viewed by other users on one or more other messaging devices, for example the recipient's computer 24. As explained above, the replacement text "Harry Potter" will be treated as a single unit. After the substitution occurs, if the user try to delete any part of the replacement text, the entire phrase "Harry Potter" will be deleted as a unit. Thus, the user is prevented from circumventing the inclusive dictionary by, for example, deleting "Potter" so that only the word "Harry" remains.

According to an example embodiment, the send function on the sender's computer 12 will be disabled whenever the text box 30 contains prohibited words. Specifically, the SEND button 32 on the sender's computer is disabled and becomes "grayed out" as long as at least one word in the text box remains highlighted. The sender must remove or change the prohibited word(s) to eliminate the highlighted text. Once the text box 30 no longer contains any highlighted words, the send function is re-enabled and the SEND button 32 becomes active again, allowing the sender to click or otherwise trigger the SEND button 32 to request transmission of the message by the messaging server 16.

According to an alternative embodiment, the disabling of the SEND button and/or the highlighting of prohibited words can be eliminated. It should be appreciated that once a sender knows what words or phrases are prohibited, by virtue of inclusion in the inclusive dictionary, it may become easier for the sender to circumvent the message filtering. Therefore, it is contemplated that the administrator of a chat site may wish to keep some or all of the contents of the inclusive dictionary more secretive. One way that this can be accomplished by eliminating the above-described highlighting function. The highlighting function could be eliminated entirely, or highlighting could be performed only for designated words. Thus, although the SEND button 32 would remain disabled as long as prohibited words or phrases were contained in the text box 30, one or more prohibited phrases may be contained in the text box 30 without highlighting. Since there may be prohibited words in the text box 30 that are not highlighted, the sender will have to modify the message through trial and error until the SEND button 32 becomes re-enabled.

As a further possible modification to the chat room 34, to help keep the contents of the inclusive dictionary more secretive, both the highlighting function and the disabling of the SEND button 32 could be eliminated. In other words, the system would permit the sender to click or otherwise trigger the SEND button 32 even if prohibited words were present in the text box 30, but not actually transmit the message. The message could then be cleared from the text box 30, and other steps could be taken to give the sender the impression that the message was sent, even though the message would not actually be transmitted to any recipient computers. Thus, it would be more difficult for a sender to determine exactly how messages are being filtered by the messaging system 10. As a further alternative, when the user clicks the SEND button 32 with any prohibited words in the text box 30, the message could be censored before it is transmitted, so that a receipt computer displays a modified version of the message, such as with some or all of the words removed, obscured, and/or replaced by replacement text. It should be appreciated by one of ordinary skill in the art that one or more of the above-described alternatives and modifications, as well as other modifications to the operation of the chat room 34, can be utilized as desired without departing from the scope of the present invention.

It should also be appreciated that the text filtering and replacement techniques described herein are not applicable only to messaging systems and chat rooms as presently disclosed. It will be appreciated that the described techniques can be readily adapted to be used in other environments and with other kinds of linguistic systems, such as email systems, word processing systems, voicemail systems, and the like, or wherever it may be desirable to filter, censor or otherwise limit the use of language.

Further, it is contemplated that the replacement text techniques described herein could be used without an inclusive dictionary-based filter and/or together with other kinds of filtering systems and methods, for example with so-called exclusive dictionary-based filters.

Furthermore, it should be evident that this disclosure is provided by way of example and that various changes may be made by adding, modifying or eliminating details without departing from the fair scope of the teaching contained in this disclosure. The invention is therefore not limited to particular details of this disclosure except to the extent that the following claims are necessarily so limited.

The invention claimed is:

1. A computer network-based messaging system for controlling content of messages sent by users in the messaging system, the messaging system comprising:
    an electronic data storage device containing a database including a plurality of permitted words and at least one replacement text element corresponding to at least one of said plurality of permitted words;
    a message filter that receives an entered word or phrase input by a user on a messaging device as part of a message, wherein the message filter uses a processor to replace the entered word in the message with a replacement text element stored in the database that matches the entered word, wherein the replacement text element includes an excluded word that is not a permitted word included in the database; and
    a message sending part that transmits the message including the replacement text element over a data network for viewing by at least one other user only if every word in the message is:
        a permitted word included in the database, and/or
        a word that forms part or all of a replacement text element included in the database,
    wherein the message sending part transmits the message including the replacement text element even though the replacement text element includes the excluded word, where the message sending part would not transmit the message if the same excluded word had been received as part of the entered word or phrase input by the user.

2. The messaging system of claim 1, wherein the messaging system provides data for displaying the message to the user by the messaging device prior to the message sending part transmitting the message, and wherein the data causes words not contained in the database to be highlighted on the messaging device.

3. The messaging system of claim 2, wherein the message sending part will not transmit the message until highlighted words have been deleted or changed.

4. A computer network-based messaging system for controlling content of messages sent by users in the messaging system, the messaging system comprising:
    an electronic data storage device containing a database including a plurality of permitted words and at least one replacement text element corresponding to at least one of said plurality of permitted words;
    a message filter that receives an entered word or phrase input by a user on a messaging device as part of a message, wherein the message filter uses a processor to replace the entered word in the message with a replacement text element stored in the database that matches the entered word; and
    a message sending part that transmits the message including the replacement text element over a data network for viewing by at least one other user only if every word in the message is:
        a permitted word included in the database, and/or
        a word that forms part or all of a replacement text element included in the database,
    wherein the message sending part transmits the message including the replacement text element even though one or more words contained in the replacement text element are not permitted words included in the database,
    wherein the messaging system provides data for displaying the message to the user by the messaging device prior to the message sending part transmitting the message, and wherein prior to said message sending part transmitting said message, said replacement text element may be deleted from said message only in its entirety such that no portion of said replacement text element may be deleted without the entire replacement text element being deleted.

5. The messaging system of claim 1, wherein the at least one replacement text element in the database consists of a single word or a phrase comprising a plurality of words.

6. The messaging system of claim 1, wherein the database comprises a plurality of replacement text elements, each of said plurality of replacement text elements corresponding to one of the plurality of permitted words.

7. The messaging system of claim 6, wherein at least one of the plurality of permitted words does not have any corresponding replacement text element.

* * * * *